(12) United States Patent
Kalavrouziotis et al.

(10) Patent No.: US 11,561,352 B2
(45) Date of Patent: Jan. 24, 2023

(54) HIGH DENSITY OPTICAL I/O INSIDE A DATA CENTER SWITCH USING MULTI-CORE FIBERS

(71) Applicant: MELLANOX TECHNOLOGIES, LTD., Yokneam (IL)

(72) Inventors: Dimitrios Kalavrouziotis, Papagou (GR); Donald Becker, Hashmonaim (IL); Boaz Atias, Maale Adumim (IL); Paraskevas Bakopoulos, Ilion (GR); Elad Mentovich, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/928,037

(22) Filed: Jul. 14, 2020

(65) Prior Publication Data

US 2021/0311266 A1 Oct. 7, 2021

(30) Foreign Application Priority Data

Apr. 1, 2020 (GR) ............................... 20200100165

(51) Int. Cl.
  *G02B 6/42* (2006.01)
  *H04B 10/25* (2013.01)
  *G02B 6/38* (2006.01)
  *G02B 6/02* (2006.01)

(52) U.S. Cl.
  CPC .......... *G02B 6/426* (2013.01); *G02B 6/02042* (2013.01); *G02B 6/3897* (2013.01); *G02B 6/4202* (2013.01); *G02B 6/424* (2013.01); *H04B 10/25891* (2020.05)

(58) Field of Classification Search
  CPC ... G02B 6/42; G02B 6/38; G02B 6/02; H04B 10/25
  See application file for complete search history.

(56) References Cited

U.S. PATENT DOCUMENTS

| | | |
|---|---|---|
| 5,905,838 A | 5/1999 | Judy et al. |
| 6,976,792 B1 * | 12/2005 | Cohen .................. G02B 6/136 385/129 |
| 8,355,638 B2 | 1/2013 | Essiambre et al. |
| 8,488,921 B2 | 7/2013 | Doany et al. |

(Continued)

OTHER PUBLICATIONS

Chen et al., "Demonstration of Full System Reaches of 100G SR4, 40G sWDM, and 100G CWDM4 Transmissions aver Universal Fiber", 2016 IEEE Photonics Conference (IPC), pp. 597-598, Oct. 2-6, 2016.

(Continued)

*Primary Examiner* — Tina M Wong
(74) *Attorney, Agent, or Firm* — Kligler & Associates Patent Attorneys Ltd

(57) ABSTRACT

A network device includes an enclosure, a multi-chip module (MCM), an optical-to-optical connector, and a multi-core fiber (MCF) interconnect. The enclosure has a panel. The MCM is inside the enclosure. The optical-to-optical connector, which is mounted on the panel of the enclosure, is configured to transfer a plurality of optical communication signals. The MCF interconnect has a first end coupled to the MCM and a second end connected to the optical-to-optical connector on the panel, for routing the plurality of optical communication signals between the MCM and the panel.

8 Claims, 3 Drawing Sheets

(56) References Cited

U.S. PATENT DOCUMENTS

| | | | |
|---|---|---|---|
| 8,503,845 B2 | 8/2013 | Winzer et al. | |
| 8,725,001 B2 | 5/2014 | Fini et al. | |
| 8,811,787 B2 | 8/2014 | Feuer | |
| 9,007,681 B2 | 4/2015 | Zhu | |
| 9,264,171 B2 | 2/2016 | Chang et al. | |
| 9,485,048 B2 | 11/2016 | Liboiron-Ladouceuer et al. | |
| 9,678,270 B2 | 6/2017 | Bigot et al. | |
| 9,917,672 B2 | 3/2018 | Jensen et al. | |
| 9,971,111 B1* | 5/2018 | Hsu | G02B 6/43 |
| 10,048,451 B1* | 8/2018 | Leigh | G02B 6/3898 |
| 2003/0021551 A1* | 1/2003 | Carpenter | B81B 7/007 385/89 |
| 2005/0135732 A1* | 6/2005 | Crow | G02B 6/43 385/15 |
| 2010/0284691 A1 | 11/2010 | Zoltmann | |
| 2010/0329671 A1 | 12/2010 | Essiambre et al. | |
| 2011/0141555 A1 | 6/2011 | Fermann et al. | |
| 2011/0235972 A1 | 9/2011 | Ruggiero et al. | |
| 2011/0274398 A1 | 11/2011 | Fini et al. | |
| 2011/0274435 A1 | 11/2011 | Fini et al. | |
| 2011/0280517 A1 | 11/2011 | Fini et al. | |
| 2013/0236175 A1 | 9/2013 | Sethumadhavan et al. | |
| 2013/0294737 A1 | 11/2013 | Dianov et al. | |
| 2014/0037244 A1 | 2/2014 | Sorin et al. | |
| 2014/0063592 A1 | 3/2014 | Ip | |
| 2014/0064687 A1 | 3/2014 | Hoover et al. | |
| 2014/0125971 A1 | 5/2014 | Jiang et al. | |
| 2014/0140694 A1 | 5/2014 | Zhou et al. | |
| 2014/0161385 A1* | 6/2014 | Lessard | G02B 6/4228 264/1.27 |
| 2015/0050019 A1 | 2/2015 | Sengupta | |
| 2015/0063754 A1 | 3/2015 | Li et al. | |
| 2015/0078744 A1 | 3/2015 | Ito et al. | |
| 2015/0086201 A1 | 3/2015 | Ryf et al. | |
| 2015/0331181 A1 | 11/2015 | Chen et al. | |
| 2015/0338587 A1* | 11/2015 | Houbertz-Krauss | G02B 6/4255 264/1.27 |
| 2016/0261351 A1 | 9/2016 | Raybon et al. | |
| 2017/0123146 A1 | 5/2017 | Chen et al. | |
| 2017/0155466 A1 | 6/2017 | Zhou et al. | |
| 2017/0336559 A1 | 11/2017 | Bookbinder et al. | |
| 2017/0363823 A1 | 12/2017 | Mentovich et al. | |
| 2018/0375579 A1 | 12/2018 | Oda et al. | |
| 2019/0086618 A1* | 3/2019 | Shastri | G02B 6/4269 |
| 2019/0140761 A1 | 5/2019 | Chan et al. | |
| 2019/0226908 A1 | 7/2019 | Rao et al. | |
| 2020/0257040 A1 | 8/2020 | Chen et al. | |
| 2020/0266894 A1 | 8/2020 | Shen et al. | |
| 2020/0389248 A1 | 12/2020 | Goto | |
| 2021/0250094 A1 | 8/2021 | Rekaya et al. | |
| 2021/0341668 A1 | 11/2021 | Swanson et al. | |

OTHER PUBLICATIONS

Chen et al., "Universal Fiber for Both Short-reach VCSEL Transmission at 850 nm and Single-mode Transmission at 1310 nm", 2016 Optical Fiber Communications Conference and Exhibition (OFC), pp. 1-3, Mar. 20-24, 2016.

"Protected Gold," Data Sheet, Pleiger Laseroptik GmbH + Co. KG, pp. 1-1, year 2012.

Chen et al., "Universal Fiber for Short-Distance Optical Communications," Journal of Lightwave Technology, vol. 37, No. 2, pp. 389-395, Jan. 15, 2019.

Liu et al., "Graded-lndex Seven-Core Fiber Optimized for High Density and Ultra-Wideband Parallel Transmission Application," OFC 2018, OSA 2018, Optical Society of America, pp. 1-3, year 2018.

Becker et al., U.S. Appl. No. 16/928,045, filed Jul. 14, 2020.

Saitoh et al., "Multicore Fibers for Large Capacity Transmission," Nanophotonics, vol. 2, No. 5-6, pp. 441-454, year 2013.

Batagelj et al., "Research Challenges in Optical Communications Towards 2020 and Beyond," Informacije MIDEM—Journal of Microelectronics, Electronic Components and Materials, vol. 44, No. 3, pp. 177-184, year 2014.

Ding et al., "On-Chip Grating Coupler Array on the SOI Platform for Fan-In/Fan-Out of MCFs with Low Insertion Loss and Crosstalk," Optics Express, vol. 23, No. 3, pp. 3292-3298, year 2015.

Optoscribe, "Fiber to Fiber Interconnects," Product Information, Optoscribe Website, pp. 1-3, year 2018, as downloaded from https://web.archive.org/web/20181218102540/www.optoscribe.com/products/fiber-to-fiber-interconnects/.

U.S. Appl. No. 16/928,045 Office Action dated May 17, 2021.
U.S. Appl. No. 17/160,422 Office Action dated Nov. 16, 2021.
U.S. Appl. No. 16/928,045 Office Action dated Dec. 6, 2021.
U.S. Appl. No. 17/315,312 Office Action dated Sep. 9, 2022.

* cited by examiner

HIGH DENSITY OPTICAL I/O INSIDE A DATA CENTER SWITCH USING MULTI-CORE FIBERS

FIELD OF THE INVENTION

The present invention relates generally to communications, and particularly to devices for transmitting and receiving optical communication signals at high data rates and manufacturing methods thereof.

BACKGROUND OF THE INVENTION

Techniques for coupling multi-core fibers to optoelectronic components have been previously proposed in the patent literature. For example, U.S. Pat. No. 8,488,921 describes a method and structure for coupling to a plurality of multicore optical fiber strands. A first plurality of optoelectronic devices is provided on a surface of a substrate, the first optoelectronic devices being arranged in a 2D array pattern that corresponds to a 2D array pattern corresponding to different light cores of a first multicore optical fiber. A second plurality of optoelectronic devices is provided on the surface of the substrate, the second optoelectronic devices being arranged in a 2D array pattern that corresponds to a 2D array pattern corresponding to different light cores of a second multicore optical fiber. Each optoelectronic device on the substrate surface provides one of a receive function and a transmit function for interacting with a corresponding core of a multicore optical fiber strand.

SUMMARY OF THE INVENTION

An embodiment of the present invention that is described hereinafter provides a network device including an enclosure, a multi-chip module (MCM), an optical-to-optical connector, and a multi-core fiber (MCF) interconnect. The enclosure has a panel. The MCM is inside the enclosure. The optical-to-optical connector, which is mounted on the panel of the enclosure, is configured to transfer a plurality of optical communication signals. The MCF interconnect has a first end coupled to the MCM and a second end connected to the optical-to-optical connector on the panel, for routing the plurality of optical communication signals between the MCM and the panel.

In some embodiments, the first end of the MCF is optically coupled directly to an electro-optical (EO) chip comprised in the MCM.

In some embodiments, the first end of the MCF has an angled facet configured to fold an optical path of the optical communication signals toward a surface of the EO chip.

In an embodiment, the optical-to-optical connector is configured to couple the MCF interconnect to an MCF outside the enclosure.

In another embodiment, the optical-to-optical connector is configured to couple the MCF interconnect to a plurality of single core fibers outside the enclosure.

There is additionally provided, in accordance with another embodiment of the present invention, a method for manufacturing a network device, the method including assembling a multi-chip module (MCM) inside an enclosure of the network device, the enclosure having a panel. An optical-to-optical connector is mounted on the panel of the enclosure, the connector configured to pass a plurality of optical communication signals. A first end of a multi-core fiber (MCF) interconnect is connected to the MCM and a second end of the MCF is connected to the optical-to-optical connector on the panel, for routing the plurality of optical communication signals between the MCM and the panel.

The present invention will be more fully understood from the following detailed description of the embodiments thereof, taken together with the drawings in which:

DETAILED DESCRIPTION OF EMBODIMENTS

Overview

Figure 1:
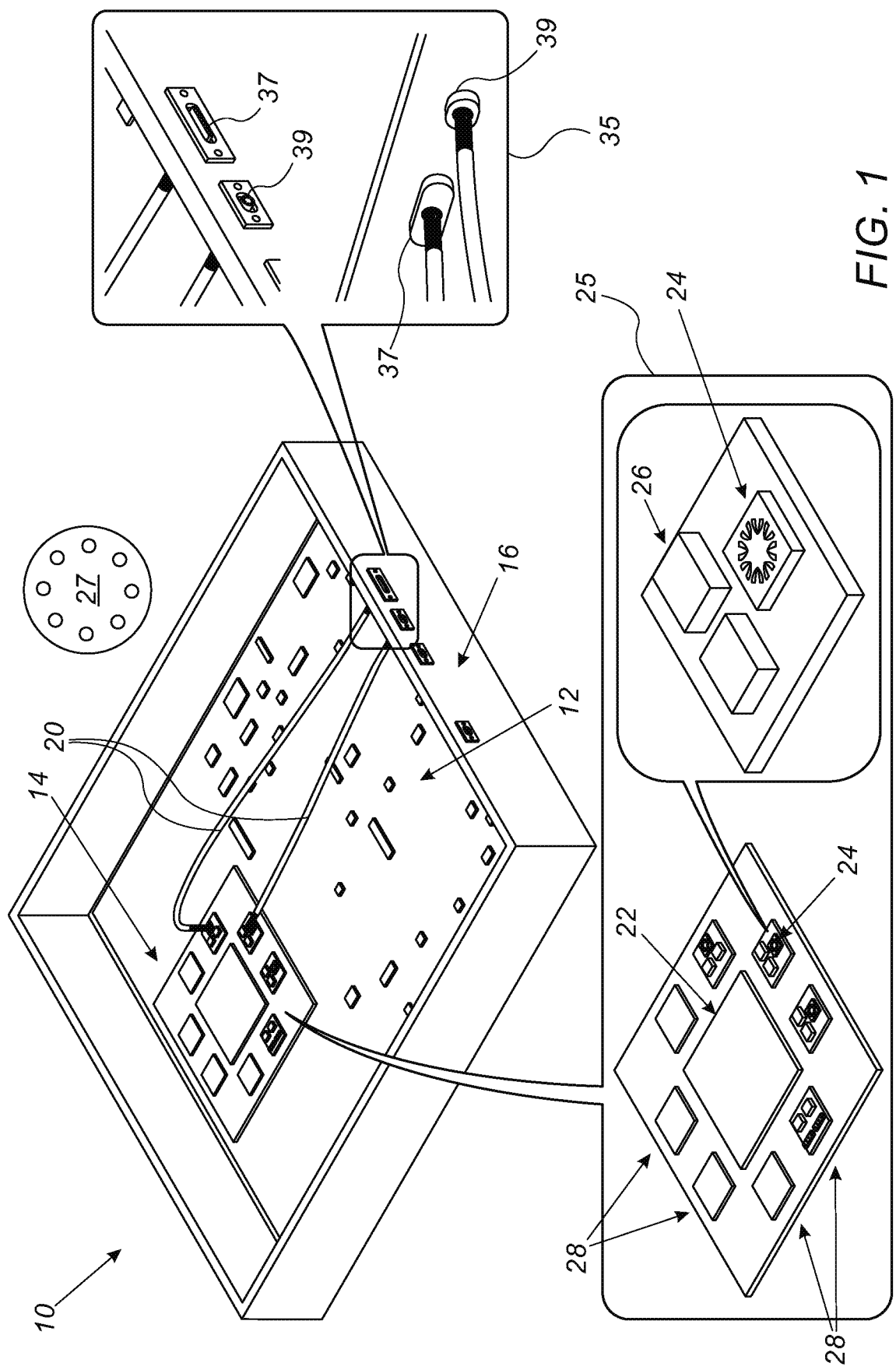
FIG. 1 is a schematic, pictorial isometric view of a network switch comprising multi-core fiber (MCF) interconnects, in accordance with an embodiment of the present invention.

A typical data center network comprises multiple network devices, such as switches, that are connected to one another by optical links, usually comprising optical fibers. A bundle of fibers that connect a pair of switches may optically transmit and receive data at high data rates.

The fibers may be coupled to the switches using pluggable I/O electro-optical modules fitted to a switch's panel to convert optical communication signals into electronic signals, and vice versa. Typically, a large number of such pluggable I/O electro-optical modules are required over the panel of each switch. In practice, attempting to further increase data rates by using more fibers and more pluggable I/O modules is difficult due to a shortage of physical space to fit more such I/O modules on the panel.

One possible solution to reduce panel density of current electrical switches is to couple high-bandwidth optical fibers directly to electronic circuits (e.g., to an ASIC) inside the switch. However, bringing the same optical fibers into the switch enclosure only shifts the I/O density problem to the inside of the switch, since the physical size (e.g., diameter) of the typical optical fiber does not comply with very high-density optical I/O required inside a switch.

In particular, an attempt to increase the number of electro-optical ports inside a switch (i.e., to directly couple the optical fibers to the ASIC) will cause increasing difficulty in the design, manufacture, and maintenance of such switches. Furthermore, the sheer number of optical fibers that must be routed and packaged inside a switch enclosure may cause problems of reliability and cooling, in addition to the above-mentioned difficulties in handling such switches that are overcrowded with optical links.

The above problems may also be exacerbated due to the demand for increased data rates, which pushes switching technology to use multi-chip modules (MCMs) inside network switches. Using MCMs may solve optical communication signals redistribution and routing bottlenecks and alleviate panel density of current electrical fabrics, but MCM-based architectures that sustain higher data rates require even higher I/O density inside the enclosure. Using MCMs eventually requires direct coupling of optical communication signals to the electronic ASICs inside the network devices (e.g., switches). Therefore, inside such switches, the numerous densely-packed paths between the electronic ASICs and connectors at the panel of the enclosure are necessarily purely optical.

In order to exploit the benefits of MCM-based architectures, embodiments of the present invention use multi-core fibers (MCFs) inside packages of high-end network-devices of a data-center network (e.g., switches, servers, NICs, etc.) which can drastically reduce the amount of optical cabling, and at the same time meet the required I/O density. Specifically, the disclosed embodiments aim at alleviating cabling issues between the electronic ASICs and the panels of data-center network equipment.

In particular, using MCFs inside the switch enclosure reduces the fiber core-to-core pitch, and allows the arrangement of fiber cores in a two-dimensional (2D) fashion (e.g., circular) to increase spatial density. Some embodiments exploit the increase in spatial density, achieved by using the MCFs, to realize an MCM packaging approach with high optical I/O density.

In further embodiments of the disclosed invention, MCFs are also used to alleviate cabling problems outside the enclosure by enabling the interconnection of network device panels using fewer cables between the devices. The disclosed solutions also reduce the density of connectors on network device panels.

Thus, by using MCFs, embodiments of the invention are able to increase optical I/O density across three domains:
The optical I/O on the MCM itself.
The optical I/O on the panel of the switch.
The optical routing density inside the enclosure (number of fibers in the enclosure).

The first two advantages directly relate to the overall communication bandwidth that can be extracted from the MCM/enclosure, while the third advantage is associated with ventilation issues and, thus, with power consumption and cooling. Using MCFs allow for reduced cabling volume in the limited space inside high-end network switches and, optionally, can also reduce spaces between the densely packed switches of an optical data center, thus enabling better ventilation and reduced cabling weight. Moreover, since electro-optical conversion is confined to the MCMs, electromagnetic interference in the device is reduced.

The disclosed MCF-based techniques may therefore enable the increase of data traffic rates between network devices inside a data center while maintaining the required form-factor and high reliability of such devices.

System Level Description

FIG. 1 is a schematic, pictorial isometric view of a network switch 10 comprising multi-core fiber (MCF) interconnects 20, in accordance with an embodiment of the present invention. In the shown embodiment, a multi-chip module (MCM) 14 is assembled in an enclosure of switch 10. The MCM is mounted on a main board 12. As seen, MCM 14 is interconnected to a panel 16 of the enclosure of switch 10 using MCFs 20. While the shown embodiment is of a switch enclosure, the disclosed layout holds also for MCMs inside an enclosure of a NIC, a server or any other suitable network communication device.

An inset 25 shows that MCM 14 comprises a substrate, a main ASIC 22, and satellite chips 28. The satellite chips undertake the electro-optical conversion, among other tasks. Typically, some of the satellite chips are electro-optical (EO) chips 24, whereas the others might be purely electrical.

While the shown embodiment has two MCFs 20 in the enclosure of switch 10, actual devices may comprise a larger number of MCFs 20.

Satellite EO chips 24 comprise electro-optical transducers such as, for example, lasers, modulators and respective driving electronics for signal transmission, and/or photodetectors and respective amplifiers for reception. Any type of electro-optical chip could work in this concept (VCSEL, Silicon Photonics, III-V, TIA, etc.), the main requirement being that the optical I/O layout 26 of an EO chip 24 is properly configured so as to efficiently match a respective MCF 20 core topology 27 in order to ensure efficient optical coupling between the two.

An inset 35 schematically shows on panel 16, optical-to-optical connectors (37, 39) mating the MCFs 20 such that switch 10 is connected to an external fiber infrastructure. Connectors (37, 39) are each an all-optical type of connector, coupling fibers directly on both sides, without any electro-optical conversion. The shown embodiment exemplifies two different kinds of panel optical-to-optical connectors that, in principle, can be used:
MCF to multi-fiber push on (MPO) connector 37 (or any other non-MCF multi-fiber connector).
MCF to MCF connector 39.

MCF to MPO connector 37 can help, for example, in interfacing switch 10 to a standard fiber infrastructure already existing in a data center. To this end, any required conversion (MCF to MPO, among others), is done in the connector.

MCF to MCF connector 39 can be used, for example, if MCFs have already been deployed in the rack or the data center.

Both types of connectors are smaller in size than existing electro-optical pluggable modules (e.g., SFP, QSFP and the like), since connectors (37, 39) are purely optical and do not require a bulky cage typical of electro-optical pluggable modules.

The isometric view shown in FIG. 1 is chosen purely for the sake of conceptual clarity. Elements of the switch that are not mandatory for understanding the disclosed techniques, such as electrical amplification stages, are omitted from the figure for simplicity of presentation.

High Density Optical I/O Inside a Data Center Switch Using Multi-Core Fibers

Figure 2A:
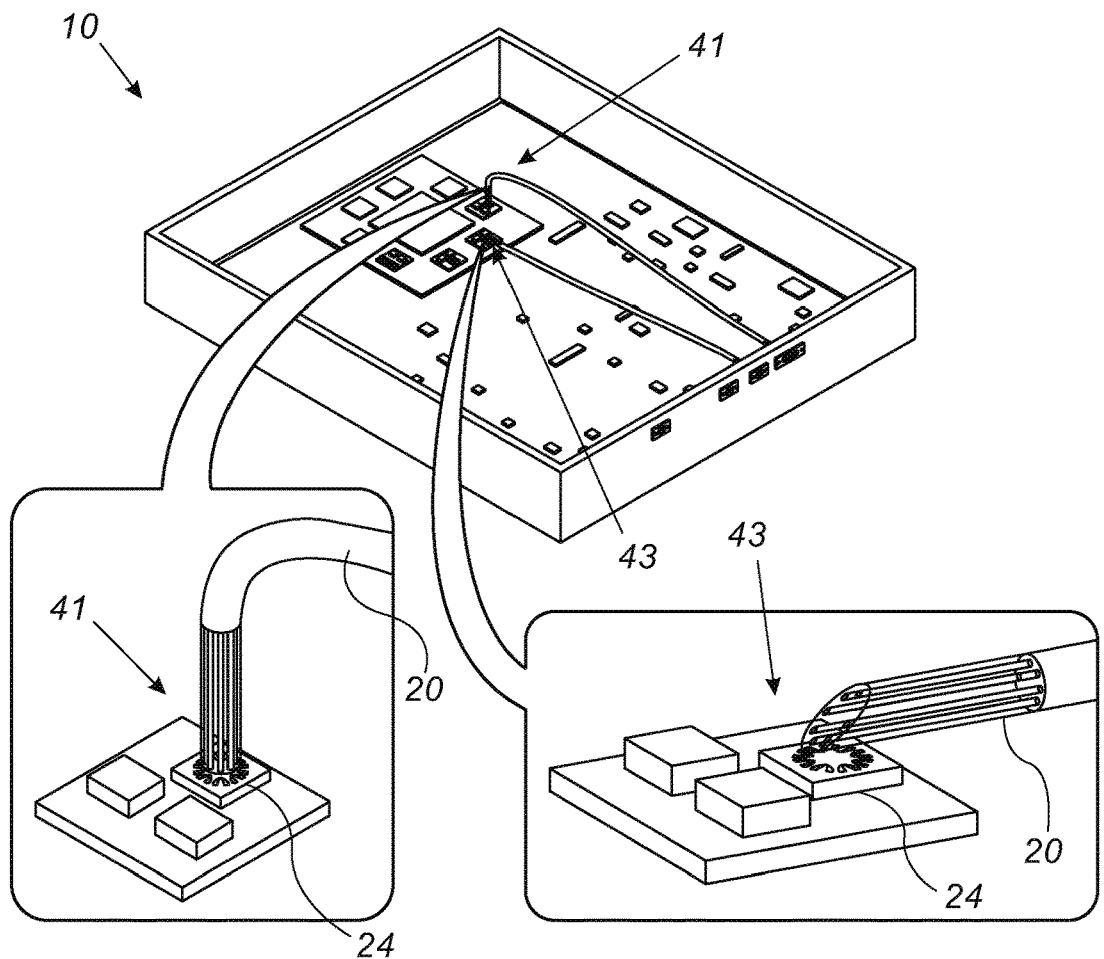
FIGS. 2A and 2B are schematic, pictorial isometric views of coupling approaches of a multi-core fiber (MCF) to a multi-chip module (MCM) inside the network switch of FIG. 1, in accordance with embodiments of the present invention.
Figure 2B:
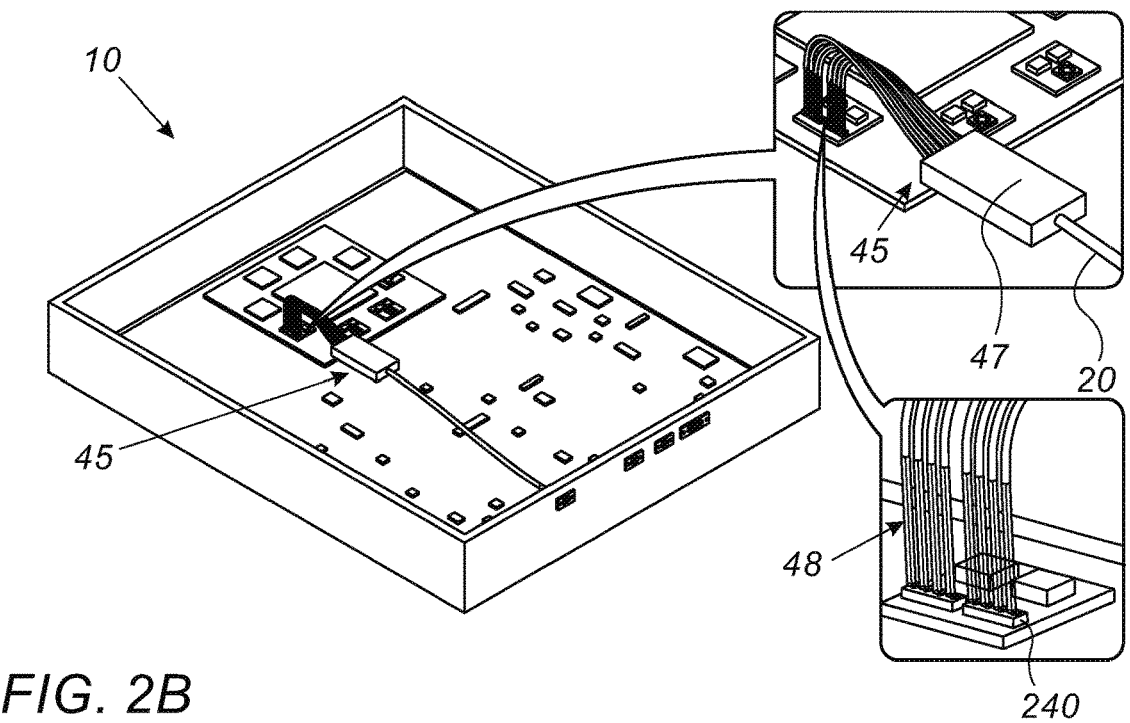

FIGS. 2A and 2B are schematic, pictorial isometric views of coupling approaches (41, 43, 45) of a multi-core fiber (MCF) 20 to a multi-chip module (MCM) 14 inside the network switch 10 of FIG. 1, in accordance with embodiments of the present invention. In the shown embodiment, MCF 20 is coupled to an EO chip 24 comprised in the MCM.

As seen in FIG. 2A, the enclosure of switch 10 comprises two MCFs 20, each MCF following different coupling approaches (41, 43) on the MCM side. For clarity of presentation, in both cases, the end tip of the MCF has been made transparent to reveal its multi core topology. The bottom left of the figure shows an out-of-plane coupling approach 41, in which the MCF is bent at a right angle such that its facet directly faces the EO chip. The bottom right shows an in-plane coupling approach 43, which folds the optical path at a right angle using total internal reflection of the optical guided waves from an angled facet of an MCF 20, or using specular reflection (e.g., from a metal-coated angled facet of an MCF 20).

As seen in both cases, the layout of electro-optical transducers on electro-optical chip 24 follows the same topology of the MCF to achieve adequate optical signal coupling. In this case, the electro-optical chip comprises an 8-channel VCSEL disposed on EO chip 24 in a circular arrangement.

The disclosed use of MCFs in network devices is not limited to a specific MCF coupling approach. Any coupling approach that ensures good matching between the optical I/O of the electro-optical chip 24 and the MCF can be used. In that sense, the two close-up views describe two examples (41, 43) to highlight the broad compatibility with different topologies, yet any other electro-optical chip/technology can be used.

Irrespective of the chip and the MCF coupling approach, coupling light directly from satellite EO chips 24 to the MCFs clearly increases the optical I/O density on the MCM side, since the optical cores are very densely arranged.

Another coupling approach may only partially utilize an MCF to simplify the coupling to the EO chip. As seen in FIG. 2B, the enclosure of switch 10 comprises an MCF 20 that is terminated in a fan-out 47, which splits the cores of the MCF into individual regular single core fibers 48.

As seen in the close-up views on the right-hand side of the figure, an electro-optical chip 240 (mounted on the satellite chip) does not have an MCF-compatible optical I/O topology, and hence cannot be directly interfaced to the MCF. For this reason, fan-out 47 is comprised in the enclosure. The fan-out may comprise an off-the-shelf component that can split the MCF core into individual single-core fibers. After this step, the individual fibers are coupled to electro-optical chip 240 in the required manner without having to consider optical I/O topology. While this variation typically does increase the optical I/O density on the MCM side, it can still assist with alleviating panel density, while also offering compatibility with electro-optical chips that are not MCF compatible.

Finally, while the embodiments disclosed in FIGS. 2A and 2B relate to MCM systems, the disclosed techniques are applicable, mutatis mutandis, to embedded optical modules (EOM) (e.g., COBO) which, unlike MCMs, are placed on the main board rather than main ASIC substrate. For such modules, MCFs could be still used to connect the EOM to the panel.

Figure 3:
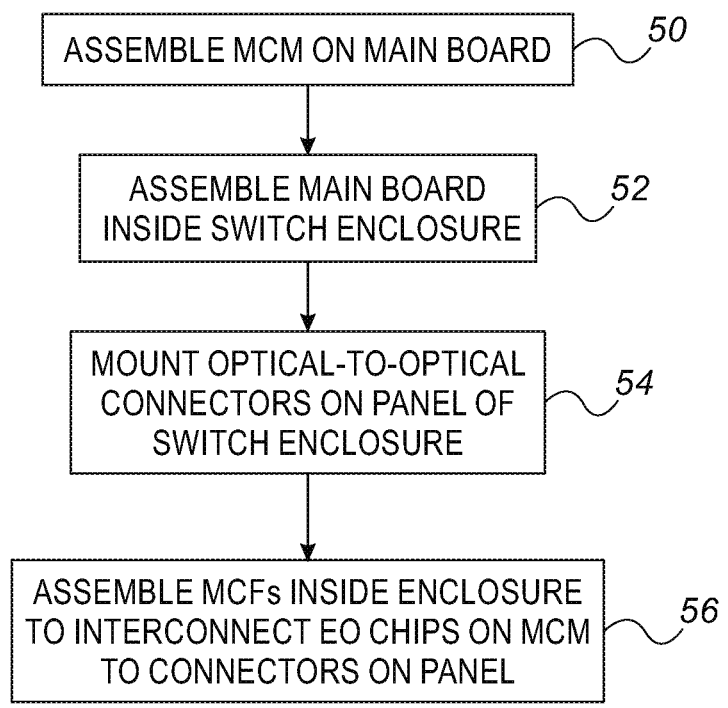
FIG. 3 is a flow chart schematically describing an assembly process of the network switch of FIG. 1, in accordance with an embodiment of the present invention.

FIG. 3 is a flow chart schematically describing an assembly process of the network switch 10 of FIG. 1, in accordance with an embodiment of the present invention. The process begins at an MCM assembly step 50, in which MCM 20 is assembled on main board 12. Next, at a main board assembly step 52, main board 12 is assembled into the switch 10 enclosure.

In another embodiment, the MCFs are glued on satellite chips 28 during the MCM assembly step 50. A following assembly step includes the attachment of a thermal solution (heat sink or heat spreader) to the MCMs.

At a connector mounting step 54, optical-to-optical connectors (37, 39) are mounted on panel 16 of switch 10 enclosure. Finally, at an MCF assembly step 56, MCFs 20 interconnects are assembled into switch 10 enclosure in a step that comprises coupling a first end of each of the MCFs to EO chips 24 of MCM 14, and coupling the second end of each of the MCFs to an optical-to-optical connector that were mounted on panel 16. As noted above, however, in an alternative assembly process step 56 may be performed before step 50 (i.e., by first coupling the MCFs and only afterwards mounting the MCMs).

The flow chart shown in FIG. 3 is chosen purely for the sake of conceptual clarity. Multiple steps that are performed during an assembly of switch 10 are omitted for simplicity, which may comprise, for example, performing electrical interconnects. Moreover, the number and order of assembly steps related to the MCF is greatly reduced in the flow chart in order to focus on the main disclosed concepts concerning use of such fibers and not divert attention into assembly engineering details.

Although the embodiments described herein mainly address use of MCFs in network devices, the methods and systems described herein can also be used in other applications, such as automotive, in autonomous cars.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
   an enclosure comprising a plurality of panels arranged to envelope a main board;
   a multi-chip module (MCM) mounted on the main board inside the enclosure;
   an optical-to-optical connector, which is mounted on at least one panel of the enclosure, and is configured to transfer a plurality of optical communication signals to an external fiber;
   a multi-core fiber (MCF) interconnect, having a first end optically coupled directly to an electro-optical (EO) chip of the MCM and a second end connected to the optical-to-optical connector on the at least one panel, for routing the plurality of optical communication signals between the MCM and the optical-to-optical connector; and
   wherein the enclosure is configured such that the MCM and the MCF interconnect are ventilated within the enclosure.

2. The network device according to claim 1, wherein the first end of the MCF has an angled facet configured to fold an optical path of the optical communication signals toward a surface of the EO chip.

3. The network device according to claim 1, wherein the optical-to-optical connector is configured to couple the MCF interconnect to an MCF outside the enclosure.

4. The network device according to claim 1, wherein the optical-to-optical connector is configured to couple the MCF interconnect to the single core fiber comprising a plurality of single core fibers, outside the enclosure.

5. A method for manufacturing a network device, the method comprising:
   assembling a multi-chip module (MCM) mounted on a main board inside an enclosure of the network device, the enclosure comprising a plurality of panels arranged to envelope the main board and configured to facilitate ventilation of components inside the enclosure;
   mounting an optical-to-optical connector on at least one panel of the enclosure, the connector configured to pass a plurality of optical communication signals to an external fiber; and connecting a first end of a multi-core fiber (MCF) interconnect to the MCM comprising optically coupling the first end directly to an electrooptical (EO) chip of the MCM, and connecting a second end of the MCF to the optical-to-optical connector on the at least one panel, for routing the plurality of optical communication signals between the MCM and the optical-to-optical connector.

6. The method for manufacturing according to claim 5, wherein the first end of the MCF has an angled facet configured to fold an optical path of the optical communication signals toward a surface of the EO chip.

7. The method for manufacturing according to claim 5, wherein the optical-to-optical connector is configured to couple the MCF interconnect to an MCF outside the enclosure.

8. The method for manufacturing according to claim 5, wherein the optical-to-optical connector is configured to couple the MCF interconnect to the external fiber comprising a plurality of single core fibers, outside the enclosure.

* * * * *